United States Patent [19]

Mentken

[11] Patent Number: 5,016,417
[45] Date of Patent: May 21, 1991

[54] MODULAR UNIVERSAL CONSTRUCTION UNITS EMPLOYING FLEXIBLE WEB WITH INTERLOCKABLE HEADS

[76] Inventor: Robert Mentken, 51 E. 97th St., New York, N.Y. 10029

[21] Appl. No.: 432,461

[22] Filed: Nov. 6, 1989

[51] Int. Cl.$^5$ .............................................. E04B 2/08
[52] U.S. Cl. ....................................... 52/571; 52/574
[58] Field of Search ................ 52/574, 570, 811, 108, 52/571; 428/119; 24/576

[56] References Cited

U.S. PATENT DOCUMENTS

| | | | |
|---|---|---|---|
| 1,356,590 | 10/1920 | Baumann | 52/574 |
| 1,381,823 | 6/1921 | Griffin | 52/570 |
| 2,386,502 | 10/1945 | Peik | 52/811 |
| 2,643,745 | 6/1953 | Olszewski | 34/189 |
| 3,251,076 | 5/1966 | Burke | 428/119 |
| 3,537,223 | 11/1970 | Lerchenthal | 52/571 |
| 3,557,413 | 1/1971 | Engle | 24/576 |
| 3,596,396 | 8/1971 | Thomson | 46/1 R |
| 3,883,975 | 3/1975 | Mentken | 40/155 |
| 3,975,882 | 8/1976 | Walter | 52/571 |
| 3,992,834 | 11/1976 | Valenzano | 52/220 |
| 4,099,887 | 7/1978 | Mackenroth | 403/4 |
| 4,147,007 | 4/1979 | Eppich | 52/570 |
| 4,550,543 | 11/1985 | Valenzano | 52/309 |
| 4,573,296 | 3/1986 | Wrigley | 52/108 |

FOREIGN PATENT DOCUMENTS 1223751 3/1971 United Kingdom ................ 52/562

Primary Examiner—James L. Ridgill, Jr.
Attorney, Agent, or Firm—David Pressman

[57] ABSTRACT

A prefabricated adaptable lightweight hollow core construction system comprising at least a unit (30) which may be extruded of plastic and which comprises a plurality of compression-resistant, flexibly connected, elongated, hollow element pairs (40). Each pair comprises a triangular base element protruding from one side of a flat flexible sheet and an octagonal head element flexibly connected to the uppermost angle of the base element. Element pairs have undersized spaces (42) between them adapted to receive elements in interlocking engagement. Adjacent head elements (36) may be manually swung apart on flexible connections (38) and forced into adjacent undersized negative spaces (42) to subsequently form rigid right-angle corners at incremental points (34a) or other shapes formed (41, 32a, 34c, 34d, 34e) along the unit. Elements of a second unit (30a) may be alternately and sequentially interlocked with those remaining elements of the first unit that are not engaged in corner formation. This rigidly extends the straight sides of right-angle corners. Forced interlocking produces high compression/tension values with concomitant rigidity within and throughout assembled constructions. Force to produce high compression/tension values is generated by leverage action of partially interlocked elements (36), one upon another between the manually driven element and the element with the highest values. Units may have an additional integral fastener (52) and/or auxiliary fasteners (54, 55, 56, 57, 58) to secure end elements (48), and rigid connectors (60, 66), or flexible connectors (61) for attachment of additional units and accessories (62, 64, 68); a cutting guide for accurate removal of unit portions (44). The unit requires no skill to assemble and can be reused. Unused portions may be used in future constructions and existing constructions may be disassembled and its units readapted into new constructions.

20 Claims, 9 Drawing Sheets

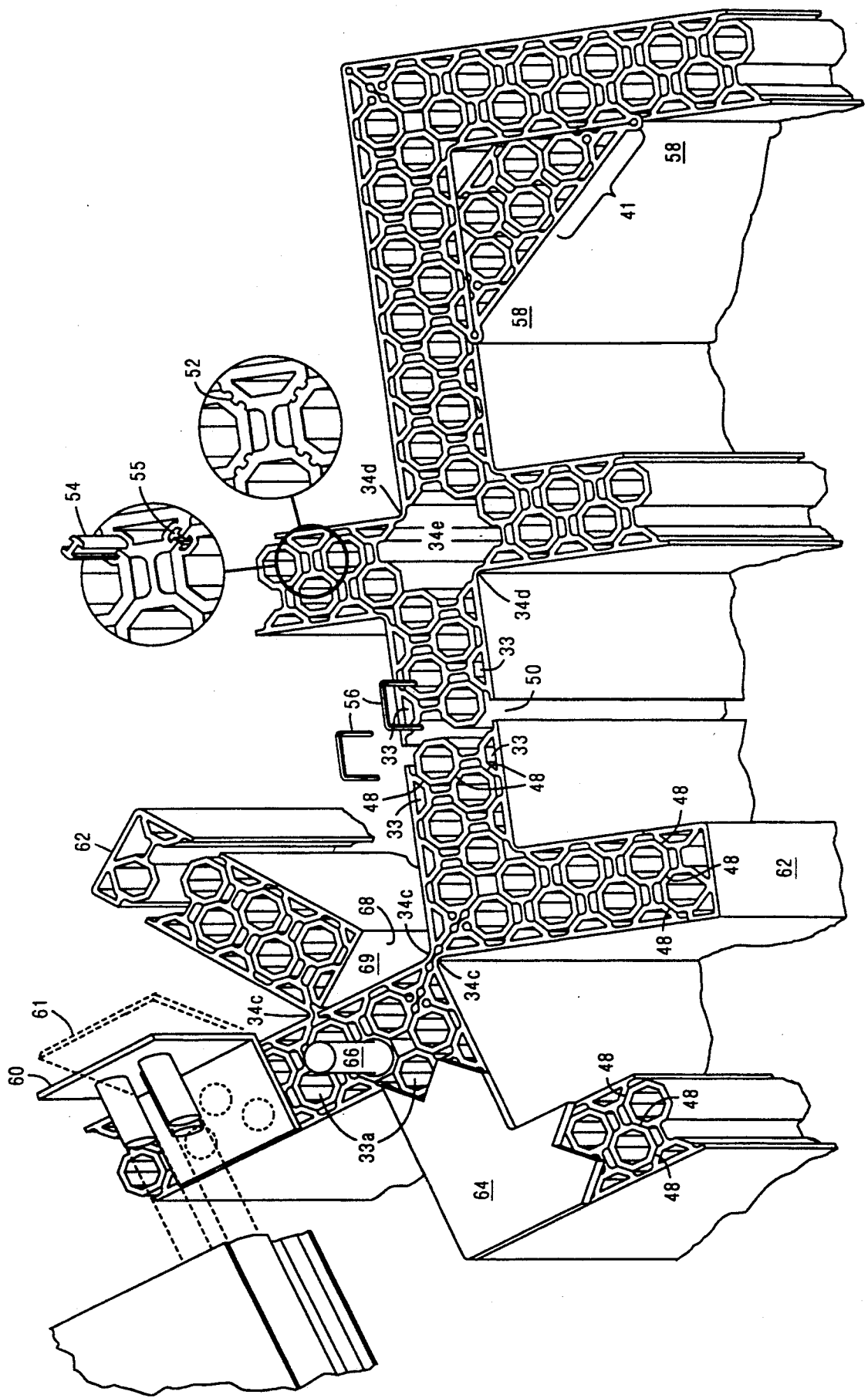

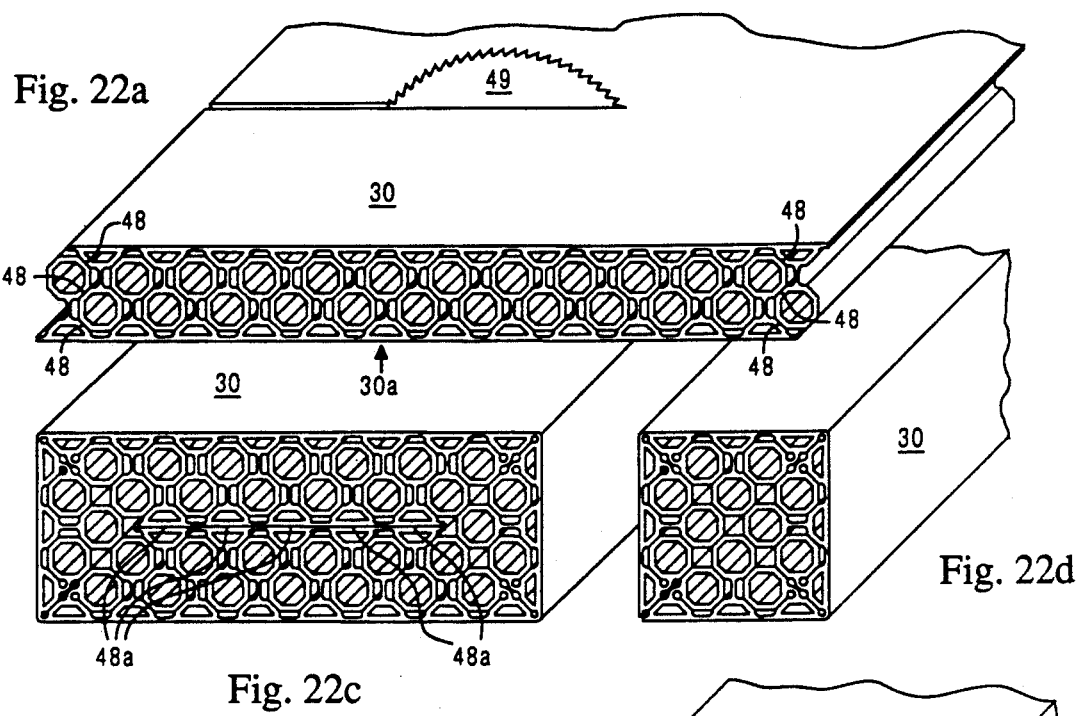
Fig. 22a
Fig. 22c
Fig. 22d
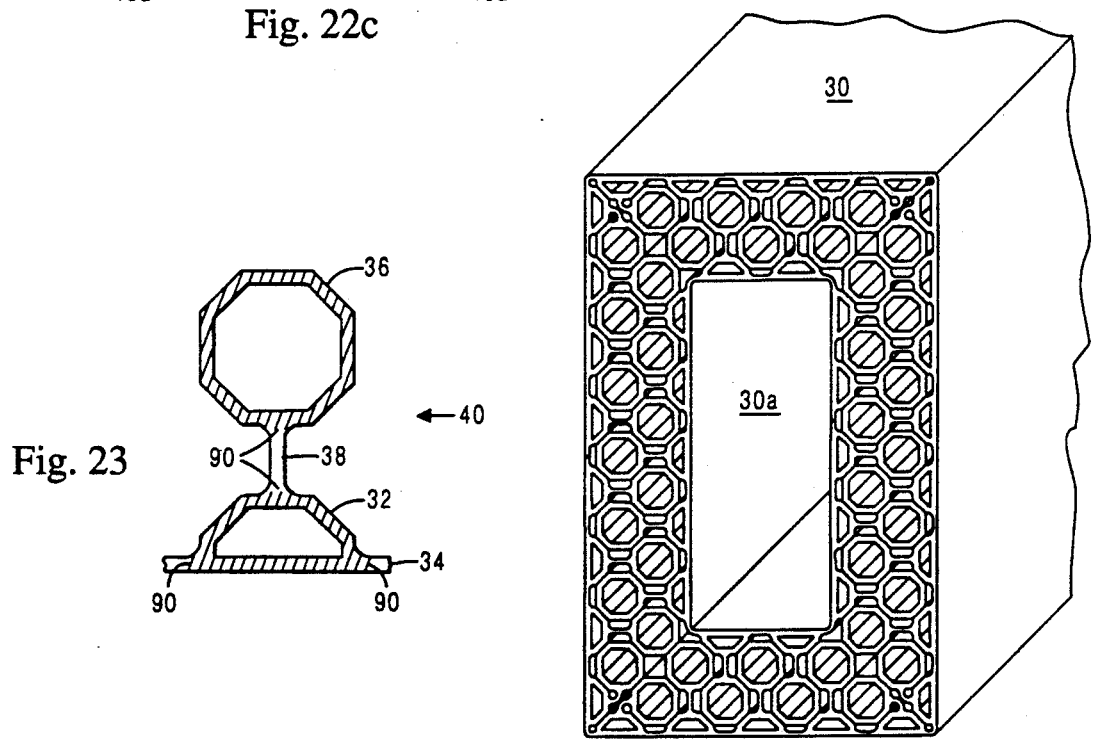
Fig. 22b
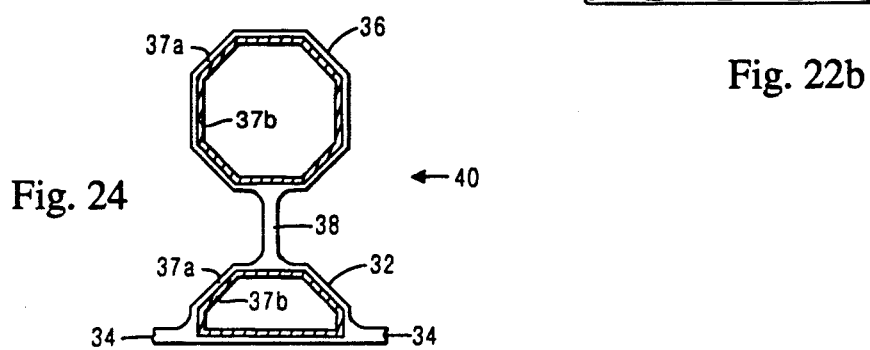
Fig. 23
Fig. 24

MODULAR UNIVERSAL CONSTRUCTION UNITS EMPLOYING FLEXIBLE WEB WITH INTERLOCKABLE HEADS

BACKGROUND

1. Field of Invention

This invention relates to construction, particularly to a multi-purpose prefabricated hollow core construction which can be assembled into a plurality of shapes and configurations easily and without the need for skill, and which may be non-destructively disassembled and reassembled into other constructions.

2. Prior Art

Heretofore, different construction materials were made to fulfill the separate and discrete functions of framing, paneling, insulating, fastening, trimming, and finishing. Even though these materials originate in diverse locations, it is typical for them to be assembled in the same way, at the same location. For example, making a partition wall first requires the erection of framing with 2 inch×4 inch wood studs, which have to be measured, cut, fitted, and nailed. Then, usually 4 foot×8 foot panels, such as plasterboard or plywood, have to be fastened to both sides of the framing with nails or screws. For exterior walls, some kind of insulation material is placed between the interior and exterior panels. Interior outside corners usually require a special steel bead fixture that is nailed to the corner posts. Next, to cover up seams between panels, a special tape is applied, together with a plaster compound, over and under the tape to conceal it and make the joints smooth. The same compound has to be used over every nail or screw head that holds the paneling to the framing. They have to be carefully driven just slightly below the surface of the paneling for this purpose. Finally, panels have to be painted to cover up the patchwork and provide a uniform appearance.

All of the above—the manufacture, distribution, and use of such diverse materials—makes this kind of construction expensive. Not the least costly is the skill and labor-intensive erection and finishing process. These separate materials and the labor necessary to assemble them account for a substantial portion of the high cost of building construction.

Furthermore, these materials can be used only once: they cannot be dismantled, even if care is used, thus adding the problem and expense of demolition to building costs.

This type of construction is unnecessary and wastes natural and human resources. It would be desirable, instead, if these separate materials and the different assembly techniques they require were integrated into one adaptable, reusable material.

To be cost-effective, temporary, rigid structures, such as in-plant or on-site offices, must be built in factories using similar conventional labor-intensive building methods as described above. Consequently, they are not collapsible and portable, like a tent, but are transportable only, usually on wheels. Rather than suit the needs of the end user, they must be shaped for the ride—long, narrow (sometimes in halves), and low, to fit on flatbed trucks, which must travel on roads and under overpasses. Also, once built, they cannot easily be rearranged or supplemented. It would be desirable if such temporary structures could be shipped collapsed, could be easily assembled on site by unskilled workers, and were capable of being rearranged and supplemented.

Moreover, the very same physical property—chemical inertness—of many of these manufacturing materials that make them useful also prevents them from biodegrading in the environment. Recycling is only a partial solution to this dilemma because of separation and collection problems. And these materials lose their desirable properties with repeated recycling. It would be desirable if products made with these materials were capable of repeated use, each use lasting as long as possible before recycling.

There are many industries, such as packing and crating, where materials, because they are not adaptable, must be destroyed in use, thus becoming waste after only one use. It would be desirable if materials used in such industries were adaptable to multiple uses.

Two-sided corrugated cardboard, for example, is widely used for packaging in this wasteful way. This material (and now its newer plastic equivalent) is limited to manufacture of boxes with relatively thin-walled outer shells. The very structure that makes them useful must be collapsed by scoring (crushing) to permit folding. This makes boxes weak and vulnerable, particularly at corners, where they require reinforcement, and turns them into trash after only one use. Thicker versions, which are either glued thin layers, or the honeycomb type, are too thick to be scored for folding. This limits their use to merely filling the interiors of conventionally framed hollow partition walls, and certain esoteric uses, such as light-duty interior displays. These uses typically require extremely labor-intensive design and fabrication methods—mainly because the exposed edges of these materials are so rough, unsightly, and easily damaged that they need finishing and protection. One method for doing this requires panels of these materials to be inserted into specially prepared frames. Another method requires the core portions of panel edges to be crushed to make room for protective strips, usually of wood, which are then fixed in place along the edges. The problem is, these frames and strips must themselves be measured, cut, mitred, assembled, glued, and finished.

The above-described problems and limitations are also true of the various foam-filled panel materials that are available.

Nondestructive universal adaptability and re-use would be desirable in such industries as convention exhibits, theatrical and window displays, office and home partitions, knock-down furniture, sheds and animal shelters, storage buildings, etc.

Standardization of parts has been the primary way of attempting to compensate for the lack of true universal adaptability. Such parts are typical of user-assembled prefabricated construction. They cannot be adjusted for size; only selected from stock. For example, prefabricated partition or display systems, in order to offer a choice of arrangements to users, typically provide different connector elements, or posts. One is used in the corner to make two-wall, L-shaped connections; another is used in three-wall, T-shaped connections; and yet another to make four-wall, X-shaped ones. These connectors are used with standard-size modular panels, which determine the spacing between the connectors. The problems with such systems are: users must have just the right kind and number of parts for each use, must accept and make-do with standard, fixed panel sizes, and the resultant uniformity. It would be desirable if partitions and displays could be assembled to any configuration and any size with a single material that integrally combines connector and panel parts.

Prefabricated picture framing is a good example of the above mentioned problem with standard sizes. The standard size frames have a serious limitation: most pictures do no come in standard sizes. The framing public wants to frame pictures of random size, but for that the choice is limited; thus expensive custom framing or section-type frames must be used.

Available in pre-mitred strips which are sold in pairs, the section frame enjoys continued sales in spite of serious problems because it attempts to emulate custom framing. It does this by offering a choice of section lengths, generally from 8" to 40".

The problems associated with section frames, however, are formidable. Dealers must stock 33 different section sizes multiplied by the number of stock units per size, constantly check inventory and reorder popular sizes. This requires an extraordinary commitment of dealer attention and store space, and because of this they tend not to replenish stock of less frequently used sizes. Also, there is no room left for a good choice of colors. The public is bored with aluminum, the most commonly available color by far. And frame colors that are available scratch and chip easily because the color is usually only on the surface. Thousands of potential dealers cannot and will not make such a commitment, even though they do want to sell frames.

Furthermore, a most important marketing advantage is lost to the section frame: impulse purchasing. Customers must know the exact picture size at the time of purchase, which means they must measure and plan in advance. Like other fixed size devices, the section frame is not adaptable. Thus, it must either be used as is, or it must be stored or thrown away. In short, it is too much trouble, requires too much skill, and is not enough fun for most people.

Fun, of course, is the purpose of construction toy sets. Usually, they are comprised of separate structural and connector elements, each in quantity, that are combined in different ways. Because of all the different kind and number of parts such sets contain, the parts are easily and frequently lost, causing the set to gradually "disappear". And they are usually bulky and expensive. A construction toy with a small number of separate parts which, nevertheless, can be assembled into a large number of configurations would be desirable. Such a toy would not only appeal to children, and adults with children in mind, but evoke an adults own playful desire for assembly.

Attempts have been made to solve some of the above problems, but these have all had one or more serious drawbacks:

Olszewski, in U.S. Pat. No. 2,643,745 (1953) shows hinged-together two-part, male-female locking elements which are stored separated and rolled up. They can be interlocked while unrolling to form a rigid, straight pole for emergency use by fire departments, and the like. However, the erected pole is uni-directional. There is no interest in, or provision for construction perpendicular to the direction of the erected pole. Furthermore, there is a contradiction between rigidity of the erected pole and how easily the elements slidably fit together. The necessary tolerances in manufacture that enable slidable assembly of the elements add up and increase as the pole is lengthened, giving a flaccid, rather than a rigid result.

Lerchenthal, in U.S. Pat. No. 3,537,223 (1970) shows various interlocking concrete building (compression) elements that are externally reinforced (tensioned) with steel sheets. These, too, can be rolled up. Provision for right angle construction, however, is not integral; adapter elements are needed. Furthermore, the integration of compression/tension forces necessary for structural reliability are solely dependent upon adequate adhesive bonding of the steel sheets to the concrete elements, and is thus subject to failure.

Wrigley, in U.S. Pat. No. 4,573,296 (1986) shows an interlocking method for forming hollow-core panels out of two sheets of formable material. Once formed, however, his panels cannot be adapted to other shapes.

Walter, in U.S. Pat. No. 3,975,882 (1976) shows hollow panels that can be interlocked to form rigid, curved panels. The radius of curvature depends upon which panel combination is selected. These, too, can be rolled up for storage. However, there is no way to form angular corners.

Mentken, in U.S. Pat. No. 3,883,975 (1975) [applicant's patent] shows flexibly connected elements intended for adaptable picture framing. Elements are in contact when arranged in a straight line, forming a rigid member. Removable corner pieces permit right angle construction, but in one direction only. Furthermore, rigidity is less than optimum because there is not enough mass in the direction of stress, and no internal rigidity-producing interlocking compression/tension.

Valenzano, in U.S. Pat. Nos. 3,992,834 (1976) and 4,550,543 (1985), and Mackenroth, in U.S. Pat. No. 4,099,887 (1978) are merely tenon and mortise variants whereby tenons and mortises are prefabricated to have angles. Different angled pairs can be selected and slidably assembled to form structures. Pairs having 45-degree angles can be assembled to be either straight or 90-degrees, depending on how they are oriented prior to slidably assembly. The lengths between joints or corners can only be changed by selecting new lengths from stock. Valenzano offers a greater variety of angle alternatives, bu they both suffer from the same contradictions: To be adequately rigid and leakproof, they must have tight-fitting, strong joints. If their joints are adequately tight and leakproof, they are also more difficult to slidably take apart and reassemble. Raised beads on sliding surfaces reduce friction, but such joints require caulking to make them leakproof. Furthermore, these types of joints depend on adequate mass around them for strength, not compression versus tension. Therefore, strength can only be increased with a corresponding increase in weight.

Thomson, in U.S. Pat. No. 3,596,396 (1971) shows cubes hinged to enable them to be rearranged in a few different groupings as an amusement only. Apart from their connecting hinges, they only contact, but do not fasten to one another.

OBJECTS AND ADVANTAGES

Accordingly, I claim the following as objects and advantages of my invention:

to provide a single prefabricated hollow core construction method and material that combines and integrates framing, paneling, fastening, insulating, and finishing functions;

to provide within a single construction unit a convenient method for forming straight sections, right-angle corners, attaching construction units to one another, accurately shortening construction units with ordinary cutting tools, and a choice of incremental locations to do all the above;

to provide a construction method and material that can be shipped and stored flat, assembled on-site without skill into any structure without being destroyed or made into waste regardless of its thickness, disassembled and reassembled into other structures, all of the above repeatedly;

to provide a construction method and material that is multi-purpose, universally adaptable, and easy to learn and use;

to provide a picture framing method that is size-adaptable and readaptable, requires no skill, is fun and easy to assemble, an aesthetic alternative, and inexpensive;

to provide picture framing that is easier for dealers to handle, is capable of wider distribution, requires only one or two stock-keeping units, and leaves room for a good choice of colors;

to evoke impulse purchases of picture framing units and spontaneous, casual, framing sessions by persons of diverse age, inclination and ability, without requiring a transparent covering, at home, at work or school; and to provide a construction material that is recyclable.

Further objects and advantages will become apparent to readers from a reading of the ensuing specification and a study of the accompanying drawings.

DESCRIPTION OF DRAWINGS

FIG. 17 is a composite overhead perspective view of several basic configurations into which the construction units may be assembled, and some connectors, fasteners and adapters.

FIG. 22a, 22b, 22c, and 22d are perspective views of some basic structures that may be assembled with the construction units.

FIG. 23 and 24 are sectional views of construction unit manufacturing variations.

Figure 1:
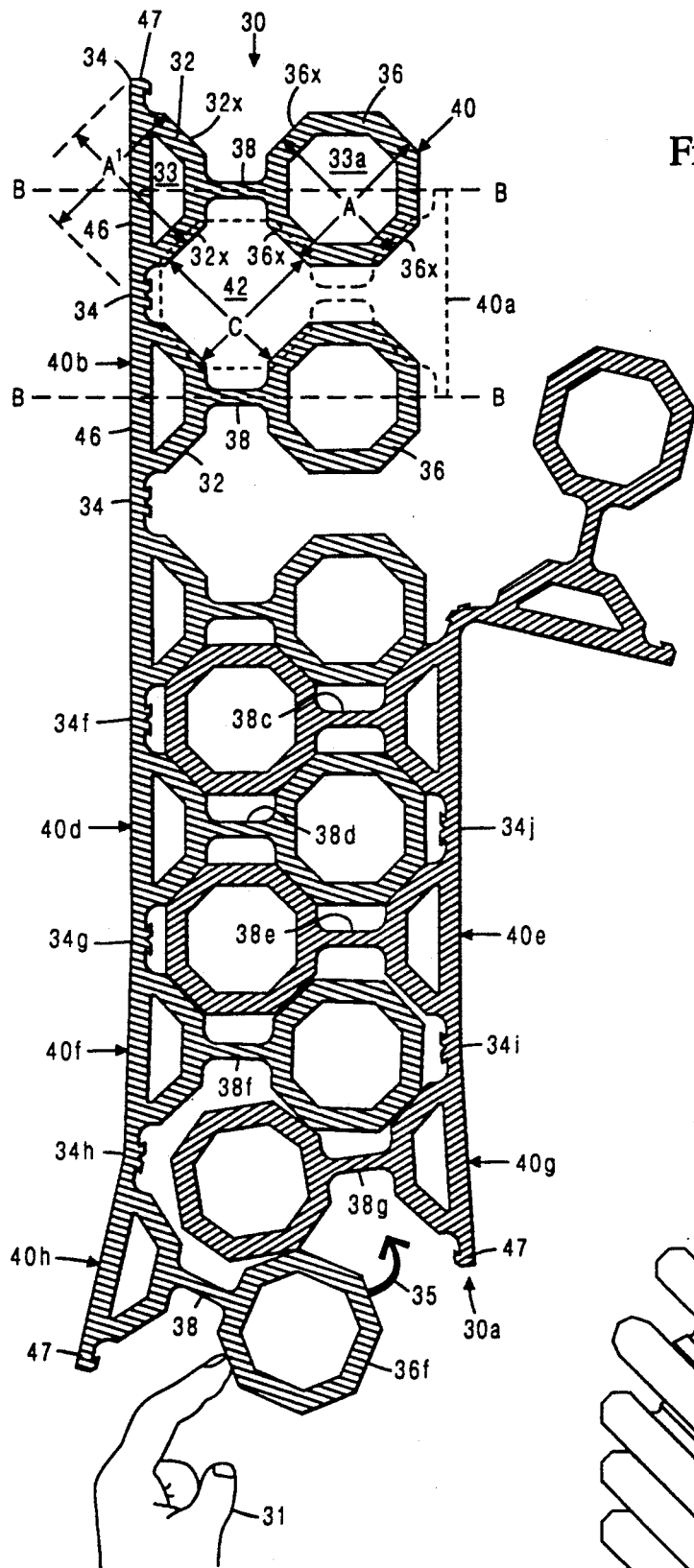
FIG. 1 is a sectional view of two partially interlocked construction units according to the invention showing some details of its proportions and operation.

DRAWING REFERENCE NUMERALS 30 first construction unit
30a second construction unit
31 manual effort made at member 36f to interlock construction units
31a fingers of hand holding members 36d and 36g in forced contact
32 triangular base member
32a two triangular base members with their base surfaces 46 in contact
32x contact points or surfaces on 32
33 lumen in triangular base member 32
33a lumen in octagonal head member 36
34 web portion of flat sheet 47 between adjacent triangular base members
34a outside corner connection of 34
34b inside corner connection of 34
34c web portion 34 between two assembled rigid structures
34d 34 acting as rigid connection for 34e
34e four wall hollow core center
34f fully tensioned flexible connection 34 between adjacent base members
34g near fully tensioned flexible connection between adjacent base members
34h slightly tensioned flexible connection between adjacent base members
34i partially tensioned flexible connection between adjacent base members
34j fully tensioned flexible connection between adjacent base members
35 direction of travel of 36f from manual effort 31
36 octagonal head member
36x contact points or surfaces on octagonal head member
36a locked octagonal head member adjacent to 36b and on one side of 34a
36b locked octagonal head member adjacent to 36a and on other side of 34a
36c octagonal head member on one side of locking elements set 40
36d locking octagonal head member adjacent to 36a and 36g in outside corner 86
36e octagonal head member on other side of locking element set 40
36f manually pushed octagonal head member
36g locking octagonal head member adjacent to 36b and 36d in outside corner 86
36L octagonal member to the left of 32a
36R octagonal member to the right of 32a
37a exterior portions of locking element set 40
37b interior portions of locking element set 40
38 flexible neck member between 32 and 36
38c flexible neck member between 32 and 36 of unit 30a fully tensioned
38d neck member between 32 and 36 of unit 30 fully tensioned
38e neck member between 32 and 36 of unit 30a near fully tensioned
38f neck member between 32 and 36 of unit 30 partially tensioned 38g neck member between 32 and 36 of unit 30a slightly tensioned
40 set of base member 32 and head member 36 connected by neck member 38
40a broken line outline of 40
40b adjacent locking element set 40
40d set of member 32 and member 36 connected by 38d in full compression/tension
40e set of member 32 and member 36 connected by 38e less loaded than 40d
40f set of member 32 and member 36 connected by 38f less loaded than 40e
40g set of member 32 and member 36 connected by 38g less loaded than 40f
40h set of member 32 and member 36 connected by 38 with manually pushed 36
41 adjacent pairs of 40 with a head member in space 42 between them
41L left half of a 90-degree outside corner
41R right half of a 90-degree outside corner
42 space between adjacent sets of member 32 and 36 connected by 38
42x 42 widened to capture two head members 36 when forming an inside corner 34b
42L left space 42 to receive left head member 36L
42C center space 42 to receive two back-to-back base members
42R right space 42 to receive right head member 36R
43 V-shaped space vacated by two adjacent swung apart octagonal head members 36
44 combination cutting guide and auxilliary connector rails centered on 34
45 channel to reconnect cut flexible connection 34 using connector rails 44
46 base surface of triangular base members
47 flat sheet of flexible material
48 end connection points on locking element sets 40 of assembled structure
48a connection points on flat sheet 47
49 table saw or circular saw blade
50 additional unit connection point
52 integral snap-fastener
54 keyed spline
keyed slot to receive keyed spline
56 large U-shaped clips
57 small U-shaped clip
58 45-45-90-degree angle adapter
60 rigid right angle adapter
61 flexible right angle adapter
62 edge finishing strips
64 end caps
66 end plugs
68 door hinge version of edge finishing strips
69 flat portion of door hinge version of edge finishing strips
70 longitudinally extended base of triangular member
72 inward facing retaining edge of 70
73 portions of 72 pre-mitred to permit corner closure
74 face of unextended portion of 40
75 J-shaped channel
76 pictures, signs and the like
77 writing instrument for tracing outline
78 straight snap-on retaining edge, extruded and die-cut
79 corner snap-on retaining edge, extruded, die-cut and routed
80 insertable die-cut teeth of 78
80a snap-in rear teeth of 78
81 die-cut teeth of 79
81a snap-in rear teeth of 79
82 corner mitre of 79
82a corner mitre of 79 as closed corner
82b flexible connection of corner mitre of 79
83 picture insert channel of 78 and 79
84 face of second construction unit 30a
85 channel 75 adjusted for thin pictures, signs, and the like
86 90-degree outside corner
87 scissors cutting picture framing construction unit 30 on cutting guide 44
88 90-degree corner complete with outside and inside corners
89 utility knife cutting construction unit 30 on cutting guide 44
90 points where rigid and flexible plastics merge
A outside dimensions of octagonal head member 36
A' outside dimensions of triangular base member 32
BB center line of locking element set 40
C inside dimensions of space 42 between adjacent set of 40

DESCRIPTION OF INVENTION

The invention comprises at least one standard construction unit 30 (FIGS. 2, 3, 4, 5, 8, and other figures) for modular use. Each unit comprises a flat sheet 47 (FIG. 1) of flexible material and a plurality of sets of locking elements, such as 40 (FIG. 8), attached to and protruding from one side of sheet 47. Each set of locking elements comprises an elongated base member or tube 32, an elongated neck member 38, and an elongated head member 36, all of which are substantially parallel in their directions of elongation, which are perpendicular to the plane of FIG. 1.

The left side of FIG. 1 shows a cross-section of construction unit 30. The right side of FIG. 1 shows a partially interlocked second construction unit 30a. Referring to the upper portion of FIG. 1, each locking element 40 comprises a rigid base tube 32 which is attached to and protrudes from sheet 47. Tube 32 may be substantially a 45-45-90- degree isosceles triangle in cross-section. Each base tube is flexibly connected by a web 34 at both its 45-degree corners to two identical triangular base tubes. The base (left) sides 46 of tubes 32 and webs 34 thus constitute sheet 47. Each base tube is also flexibly connected by a web or neck 38 at its 90-degree (right) corner to the 90-degree corner of a rigid head tube 36, which may be octagonal in cross-section.

The crosswise dimensions A of head tube 36 are substantially equal to one of the two equal sides A' of base tube 32. The head tube occupies substantially twice the volume of space of the base tube.

The primary and common attribute among all embodiments is that at least four equidistant contact surfaces 36x are provided on head tube 36, and three are provided on base tube 32. Each base tube 32 comprises two contact surfaces 32x and one flat or base surface 46.

Although base tube 32 is referred to as triangular, and head tube 36 is referred to as octagonal, these members may have other shapes, such as semicircular and circular, respectively, in which case the contact surfaces referred to may actually be contact points. This may be advantageous in certain applications.

Figure 14:
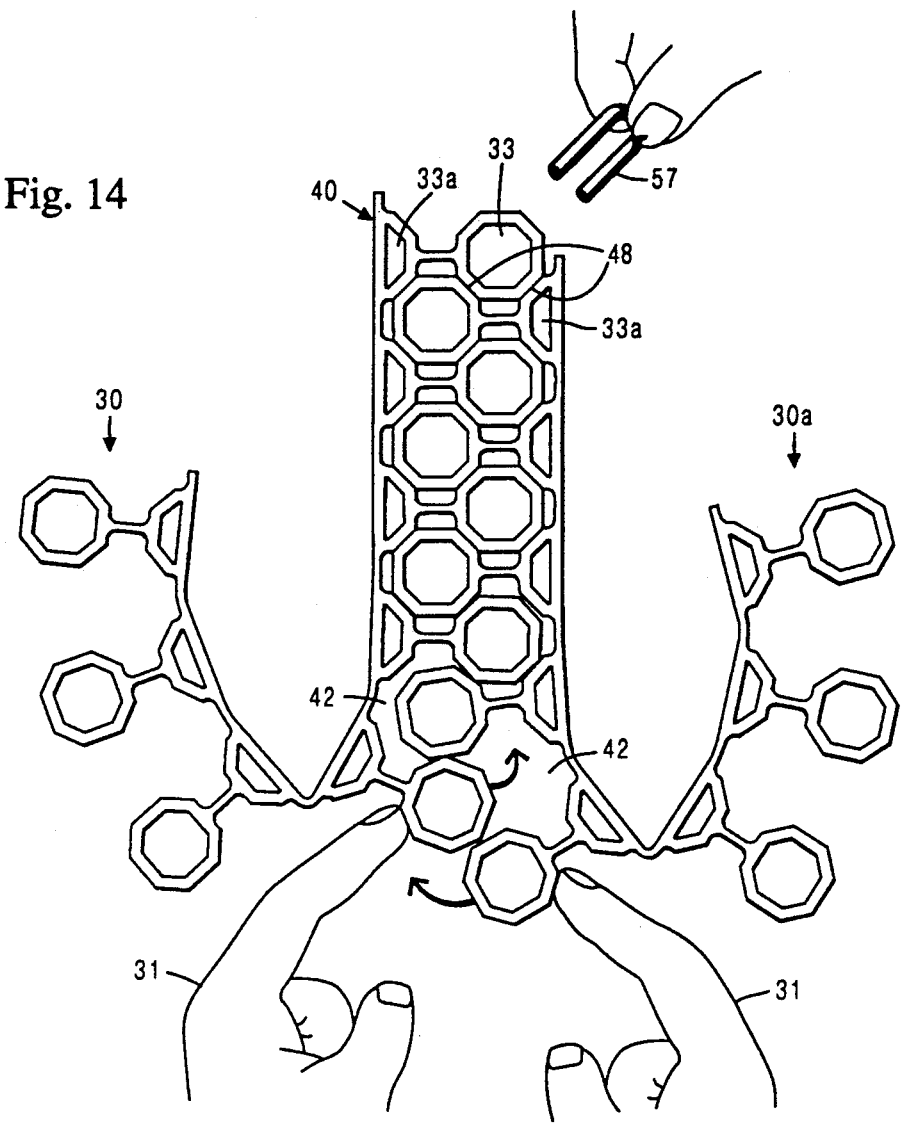
FIG. 14 is a sectional view of two construction units being interlocked.

The position of two surfaces 32x on base tube 32 generally match the position of their counterpart surfaces 36x on head tube 36 when these surfaces are in contact, or when the apposed surfaces of adjacent triangular base tubes are in contact. Contact can occur at least four basic ways:

(1) Separate unit contact. At least two separate construction units interlock to form straight structures. The middle portion of FIG. 1 shows construction unit 30 (leftmost) interlocked with construction unit 30a (rightmost). Straight interlocking is also shown in FIG. 14, as well as straight portions of other figures.

Figure 3:
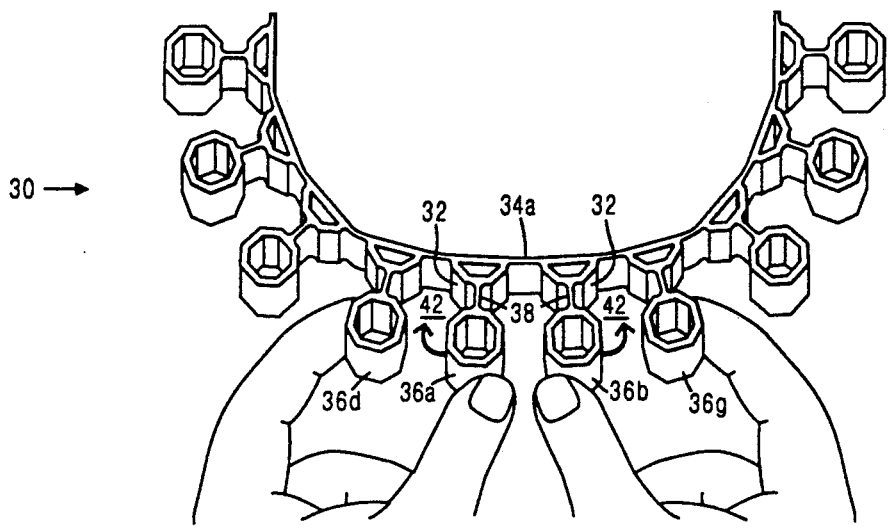
FIGS. 3, 4, and 5 are sequential overhead perspective views of an outside corner being formed on the construction unit.
Figure 4:
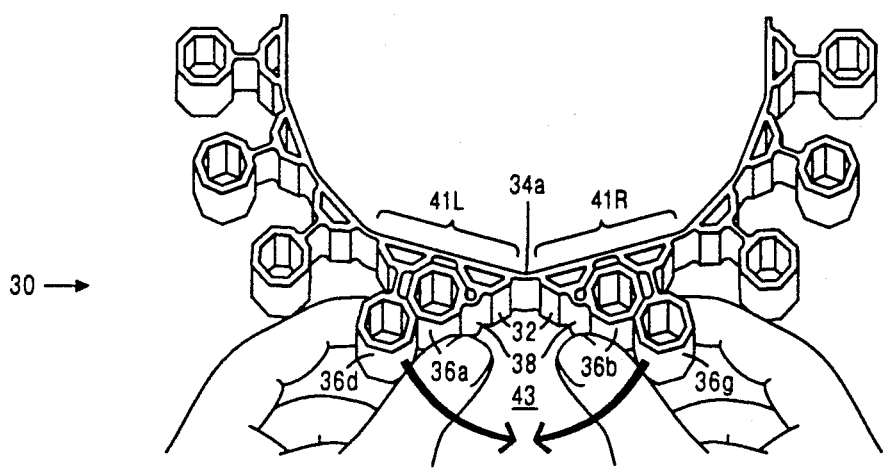
Figure 8:
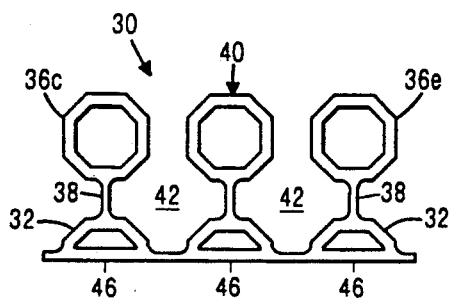
FIGS. 8, 9, and 10 are sequential sectional views of a simple structure formation using only one construction unit.
Figure 9:
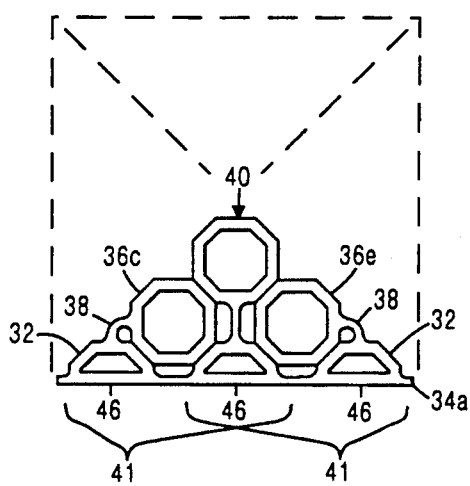

(2) Adjacent tube contact. Triangular tubes of the same construction unit are forced into contact. FIGS. 3 and 4 show adjacent octagonal tubes 36a and 36b flexed 90-degrees, away from each other, bilaterally, on their web members 38 and forced into adjacent spaces 42. This produces rigid first sub-units 41L (left) and/or 41R (right). FIGS. 8 and 9 show octagonal tubes 36c and 36e flexed 90-degrees towards each other, also bilaterally, with a common element set 40. In this way they make a second sub-unit, a rigid isosceles triangle. FIG. 17 shown how a tube sub-unit 41 (far right) may be produced unilaterally, as in a 45-degree angle connection.

Figure 10:
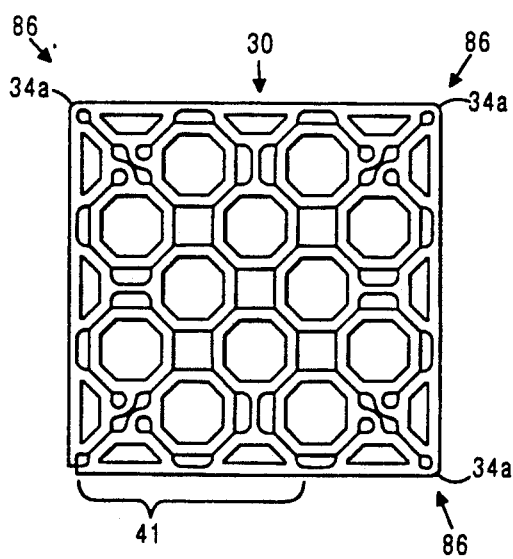

(3) Tube sub-unit contact. Rigid tube sub-units of the same construction unit make contact, as in FIG. 5, 41L and 41R. FIG. 10 shows four contiguous, rigid isosceles triangles of FIG. 9, all of which are formed as in #2 above. They are sequentially flexed 90-degrees on the web members 34a between them to make contact.

(4) Back-to-back contact. At least two triangular tubes 32 are placed back-to-back with their sufaces 46 in contact, as in FIG. 11. The two back-to-back triangular tubes together (32a) have substantially the same shape, and occupy the same volume of space as one octagonal tube, such as 36L or 36R.

Contact surfaces may be held against each other with a variety of auxilliary fastening methods, in addition to the primary method, which is described below.

Note (FIG. 1) lumen 33 in base tube 32, and lumen 33a in head tube 36. These lumens have important advantages: they eliminate unessential material, thus reducing weight; they simplify manufacturing; and they provide interior gripping surfaces for certain connectors, adapters and accessories, as will be described later.

Dimensional relationships

The upper portion of FIG. 1 shows flat surfaces 46 of adjacent base tubes 32 arranged in a straight line, and their attached head tubes 36 aligned on parallel center lines BB. These center lines are perpendicular to the aligned surfaces 46. With these adjacent element sets 40 and 40b so aligned, inside dimensions C of space 42 defined by, and between adjacent element sets 40 and 40b is similar to, and somewhat smaller than outside dimensions A of octagonal tube 36, and A' of triangular tube 32. For graphic comparison, broken line outline 40a of a typical set of elements is superimposed over space 42. Element sets 40 and 40b may be otherwise adapted to receive an element set in an interlocking, mating relationship which description follows.

Construction units of the invention may have any convenient number of contiguous element sets 40. They can also have any convenient longitudinal dimension, but for structural stability it should be no less than the dimension of base 46 of triangular tube 32, as measured between the centers of its two web connections 34. For example, if base 46 is 2.5 centimeters, then the longitudinal dimension should be at least 2.5 centimeters.

Figure 2:
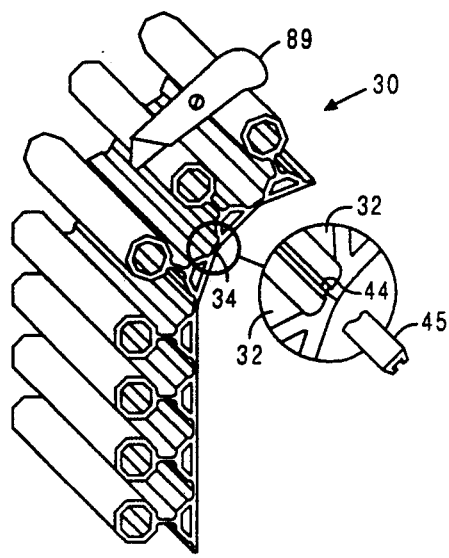
FIG. 2 is a broken away perspective view showing the construction unit being cut with a utility knife, and a method of reconnection.

FIG. 2 shows flexible connection 34 on the same side as, and midway between adjacent triangular tubes 32, where there may be a combination cutting guide and auxilliary connector rails 44. These facilitate accurate cutting apart of longer construction units into shorter ones, and with reconnection channel 45, provide gripper edges for reconnection of cut web 34.

Also, a cutting guide (not shown) may be provided for automatically centering a cutting blade (not shown) between adjacent elements when cutting.

Manufacturing

Since construction units generally have a uniform cross-section, they can be manufactured using the most efficient manufacturing method, extrusion. It is thus the preferred method.

Construction units for different embodiments, no matter how diverse, may be manufactured utilizing the same extrusion dies. Dies would require relatively minor adjustments between manufacturing runs to adapt them to meet different specification values, such as changes in wall thickness.

Figure 20:
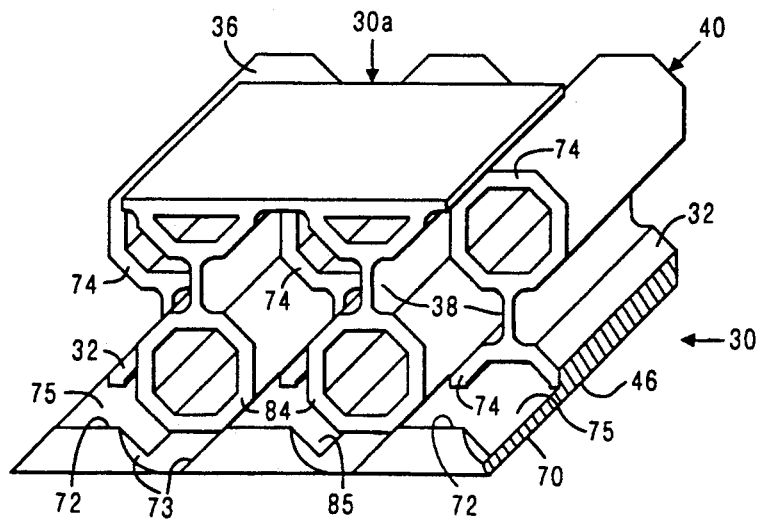
FIG. 20 is a perspective view of two construction unit details showing two features of picture framing embodiments.

Plastic injection molding may be used in certain embodiments where the cross-section of the units may not be uniform, such as with integral picture retaining edge 72 in FIG. 20, and with certain accessories, such as seen in FIG. 17, right-angle adapters 60 and 61, and end caps 64.

For structural integrity and manufacturing simplicity, the preferred embodiment of the invention calls for manufacture with a single, tough plastic material of the long-molecular-chain-structure variety. This type of plastic is noted for its tensile strength and flexibility in relatively thinner sections, yet can be relatively rigid and compression resistant in thicker sections. Products that make use of these properties and make use of one of these plastic materials are known in the art as having "living" or "neck" hinges. Accordingly, in the FIG. 1 version of the invention, the plastic will behave rigidly (tubes 32 and 36) or flexibly (webs 34 and 38) depending on its thickness.

However, embodiments may be desired that have thinner walls, with less weight, but without sacrificing rigidity and strength. This may not be achievable with a single plastic material. FIG. 23 shows how rigid elements 32 and 36, and flexible connections 34 and 38 may be coextruded, or coinjected, with different, yet related materials, enabling connections 34 and 38 to be flexible, and elements 32 and 36 to be rigid. This may be accomplished only provided impact resistance and structural integrity can be maintained under stressful conditions where the two materials fuse, or intermix, at points 90.

Alternatively, FIG. 24 shows how interiors walls 37b of hollow elements 36 and 32 may be coextruded, or coinjected, with a material of greater rigidity than the exterior portions 37a and flexible connections 38 and 34, or thin, lightweight, rigid metal or plastic tubes can be placed within to reinforce the interiors throughout.

Holes may be molded, punched, or drilled into any flat surface of the construction units during manufacturing (not shown) to provide sites for fastening with conventional fasteners, such as screws or bolts—or to keep unit weight to a minimum.

Fasteners and connectors

There are at least three occasions when fasteners and connectors augment and extend the usefulness of the construction units of the invention by connecting elements not normally connected:

(1) At the beginning or end of a structure being assembled. This is necessary at these sites because there is no next set of elements 40 (FIG. 14) to capture and hold them. Auxilliary connection is needed at least at one point 48, or interlocked elements will separate due to internal tensions, as will be described. FIG. 14 (upper portion) shows a small U-shaped clip 57 being placed between the penultimate and last set of locking elements at a point 48.

(2) When adding length to a structure or connecting two structures end-to-end or by stacking flat structures. FIG. 17 shows large U-shaped clips 56 connecting two structures end-to-end by inserting them into lumens 33, thus attaching them at point 50. FIG. 22c shows an example of how two flat, stacked structures can be reinforced by fastening at points 48a (not shown).

Figure 6:
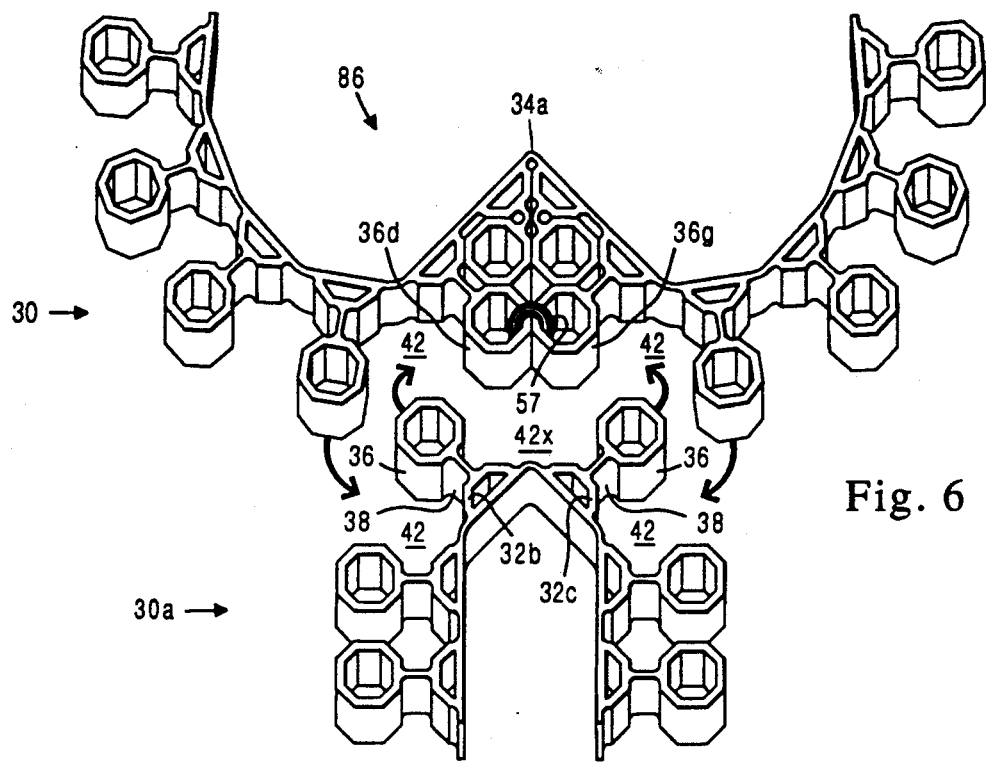
FIGS. 6 and 7 are sequential overhead perspective views of an inside corner being formed in cooperation with the outside corner of FIGS. 3, 4, and 5.
Figure 7:
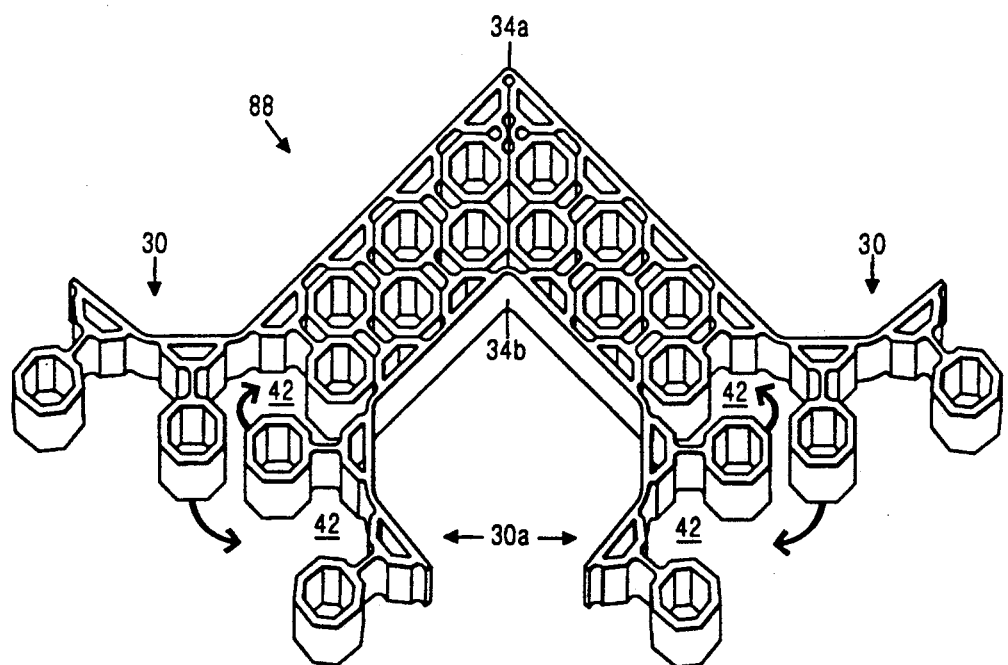

(3) When temporarily holding elements together to hold a corner closed until they can be captured by elements of another unit. FIG. 6 shows how a small U-shaped clip 57 hold octagonal elements 36d and 36g together while waiting for adjacent octagonal elements 36 of construction unit 30a to capture them. FIG. 7 shows the elements of unit 30 captured only by the elements of unit 30a with clip 57 (of FIG. 6) removed.

Fasteners need not be the clips referred to above. They can be integral to the units (FIG. 17) and located at all points that might make contact. They can be of the male/female snap-on variety, as shown at 52. Such fasteners can be designed to be easy-on/easy-off, easy-on/difficult-off or one-way, with barbs (not shown) to provide permanent closure. Snap-fastener designs such as 52 would be determined by the needs of particular embodiments intended for particular uses. The easy-on/easy-off type, for example, would be suitable for a construction toy, whereas the easy-on/difficult-off, or one-way type might meet certain industry requirements. The degree of removal difficulty must exceed internal tensional values (described below) generated by the units in use, or snap-fasteners will not hold.

It is important to note that the geometry of the units permits proper mating of male/female snap-fasteners within single units, regardless of how tubular elements, or tube sub-units are flexed and arranged. The same is true of two or more separate, interlocked units, regardless of the shape of a structure, provided that the original orientation of units, which can be only one of two choices, is correct.

Fasteners may also be insertable, such as keyed splines 54 into keyed slots 55 located at all points that might make contact, or large U-shaped clip 56 may be inserted into adjacent lumens 33, and, as in FIG. 6, small clip 57, both of which may be used only where needed. A large U-shaped clip 56 can double as a picture hanging clip in that embodiment.

Figure 11:
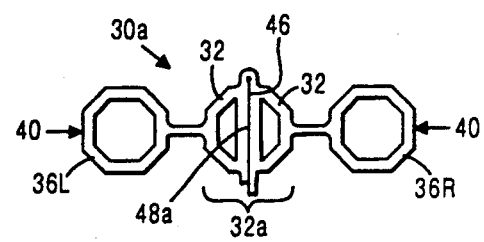
FIGS. 11, 12, and 13 are sequential sectional views of a structure formation using two construction units.

An alternative accessory connector similar in cross-section to FIG. 11 is contemplated for fastening stacked separate flat structures, such as the center portion of FIG. 22c. It would be formed as one piece, having three aligned octagonal head members connected by two necks.

Different fastener types may be used in a single embodiment, including conventional fasteners, through holes that may be provided on flat surfaces of construction units (not shown).

Accessories and adapters

FIG. 17 also shows accessories which include extrusion 58 for adding a member at a 45-degree angle to a 90-degree corner for triangular reinforcement, both assembled according to the invention. Adapter 60 (rigid) permits right-angle construction perpendicular to the direction of elongation. Adapter 61 (flexible) enables the making of swinging lids and the like, also perpendicular to the direction of elongation. Edge finishing strip 62, end cap 64, and plug 66 are for use along edges perpendicular, as well as parallel to the direction of elongation, to provide smooth, finished edges.

Strip 68 finishes the edge of a panel assembled for making a door or the like by enabling flexible connection 34c to act as a full-length hinge. Strip 68 is essentially half an element pair 40 with a flat surface 69 corresponding to center line BB of FIG. 1. Another strip 68 may be used to finish the door jamb (not shown), whereby surfaces 69 of both strips 68 are in contact when the door is closed. Variant strips may include a door stop edge (not shown).

Accessory strips 62, 68 and adapter 58 run parallel to the direction of elongation. They can be fastened to members with the same methods as described above. Accessories 60, 61, 64, and 66 are applied perpendicular to the direction of elongation. They can be fastened to structures by being snugly inserted into lumens 33a.

Adaptable picture framing

Figure 21:
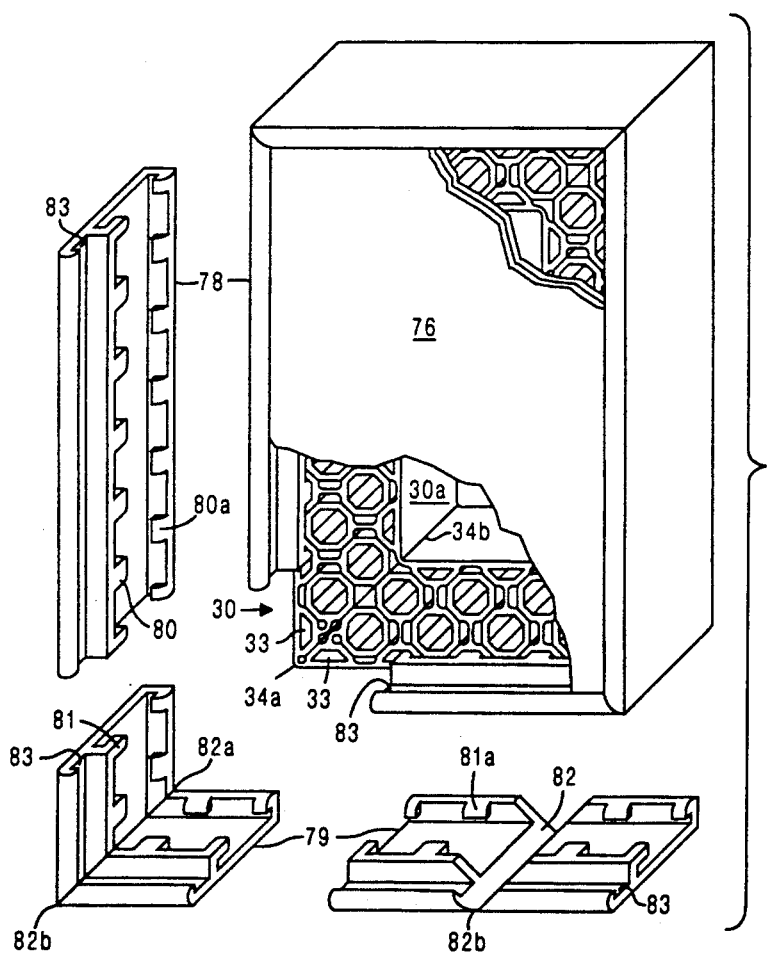
FIG. 21 is a perspective view of two interlocked construction units with exploded details of one of the picture framing embodiments.

FIGS. 20 and 21 show another embodiment of the invention for adaptably framing pictures, signs, and the line. In this embodiment, generally two interlocked construction units 30 and 30a form the frame, with unit 30 forming its outer peripheral edge. FIG. 20 shows the base portion 46 of the triangular tube 32 of the outer unit 30 extended longitudinally 70 and terminating with a right-angle, inward facing retaining edge 72. This retaining edge is spaced from, and parallel to the apposed face 74 of the unextended portion of the element pair 40. In combination, face 74, extension 70, and retaining edge 72 form a substantially J-shaped channel 75 for receiving and holding graphics, sheet materials, and the like.

The extension may be either integral, as in FIG. 20, or a snap-on accessory, as in FIG. 21. In the integral version, each retaining edge 72, as defined by base 46, may be pre-mitred, as in mitres 73, to permit right-angle corners to be formed at any point. Mitres may be concealed with an integral membrane of plastic (not shown) to give the appearance of a continuous edge. The membrane can be adapted to collapse and disappear into the mitre upon closure of the corner.

FIG. 21 shows an alternative, snap-on version of the picture retaining edge. Extrusions 78 and 79 provide retaining edges for straight sides and corners, respectively. They may be die-cut to have teeth 80, 80a, and 81, respectively, whereby teeth 80 and 81 may be inserted into lumens 33 in the front of the triangular tube elements of outermost unit 30, and teeth 80a and 81a are snapped into the rear (not shown) of the same lumens 33. Corner retaining edges may be advantageously extruded from the same die as straight retaining edges. Corner 79 requires mitre 82 to permit closure of corner 82a. This may be done with a router. Mitre 82 does not completely penetrate extrusion 79, thus leaving a flexible connection 82b on which to swing the corner closed. It also adds strength to corners. Edges may be supplied in pre-cut form, in modular denominational lengths, and with a choice of colors. They are selected and snapped on, butt end-to-end, around the entire periphery of the four-cornered structural support which has been assembled to a desired size. In combination, they enable a picture of any size to be framed.

With this version, color choice is facilitated, since only the thin, compactly packaged extrusions 78 and 79 need be stocked in different colors.

In accordance with the high adaptabilty of the invention, the framing embodiment also provides an adjustable way to secure a picture assembly with a snug fit from the rear, regardless of its thickness. This eliminates the need to insert filler sheet materials that are usually needed to fill out frames with fixed channel thickness. The picture assembly should include a stiff backing, say, of cardboard. Referring to FIG. 20, this is accomplished by deliberately not aligning face 84 of unit 30a with face 74 of unit 30. Thereby the longitudinal distance may be reduced between retaining edge 72 of unit 30 and face 84 of unit 30a, which has no extended portions. In this way, J-shaped channel 75 can be adjusted in size to accept a range from extremely thin pictures 85, to the maximum thickness, which corresponds to J-shaped channel 75 when units 30 and 30a are aligned (not shown).

The same adjustment can be made with the snap-on version (FIG. 21) with the exception that the maximum insert thickness corresponds to the capacity of channel 83.

Figure 19:
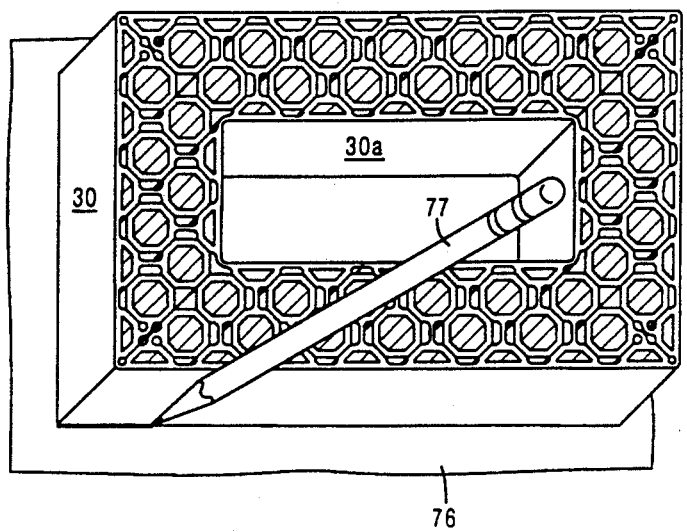
FIG. 19 is an overhead perspective view of two interlocked construction units being used as a template in a picture framing embodiment.

There is an additional advantage to the snap-on version. Once assembled to selected size, construction units 30 and 30a may serve as a template (FIG. 19) for tracing its outline with a thin pointed writing instrument 77 on the back of any picture, backing, or the like 76 to be framed, in preparation for cutting them to size. Tracing can be done after assembly, but before retaining edges are placed. This technique completely eliminates careful measuring and plotting of lines before cutting, a skill that most persons who wish to frame their own pictures do not possess.

Moreover, because they have a uniform cross-section, the construction units used in this version may advantageously be extruded from the same dies as used for other embodiments.

OPERATION

Operation with two construction units

FIG. 1 shows how the invention utilizes cooperating, interlocking compression versus tension to achieve rigidity. Rigid members are sequentially forced into undersized spaces, captured, and locked in by surrounding members, which are themselves, in turn, captured, and locked in. Dimensions A and A' of typical element sets 40 and 40b are represented by broken line outline 40a which is superimposed over space 42 of unit 30 for size comparison. The dimensions C of space 42 are deliberately made too small to receive the members intended to be captured by it. Captured members are rigid, compression resistant and relatively unyielding. Consequently, surrounding flexible connections 38, 34, and 38 must become tensioned when they are forced to reach around and accommodate captured members.

It should be emphasized that whenever reference is made to compression/tension, much higher values are meant than the mere snug fit familiar to those skilled in the art. A great deal of force is needed to drive a captured head member 36 to create tension of the desired value in neck members 38, 34, and 38. This force may be greater than is possible with directly applied manual effort. Accordingly, the construction unit provides a way to compound manual force. Manual effort is made a few members ahead of where great tension is needed. Each head member in between serves as a fulcrum for leverage that compounds the initial manual effort. This can be seen in the lower portion of FIG. 1 where elements of unit 30 and a second unit 30a are shown being interlocked. A manual effort 31 to interlock apposed unit 30a is made at member 36f of element pair 40h in the direction of arrow 35. The force generated by this effort is transferred, passes through, and is compounded by element sets 40g, 40f, and 40e. These members are compressed, and flexible connections 38g, 38f, 38e, and 34h, 34i, and 34g are tensioned in increasing degrees until the maximum compression/tension values are reached in element set 40d, and its own neck member 38d, surrounding, and associated flexible members 34f, 38c, and 34j.

Figure 16:
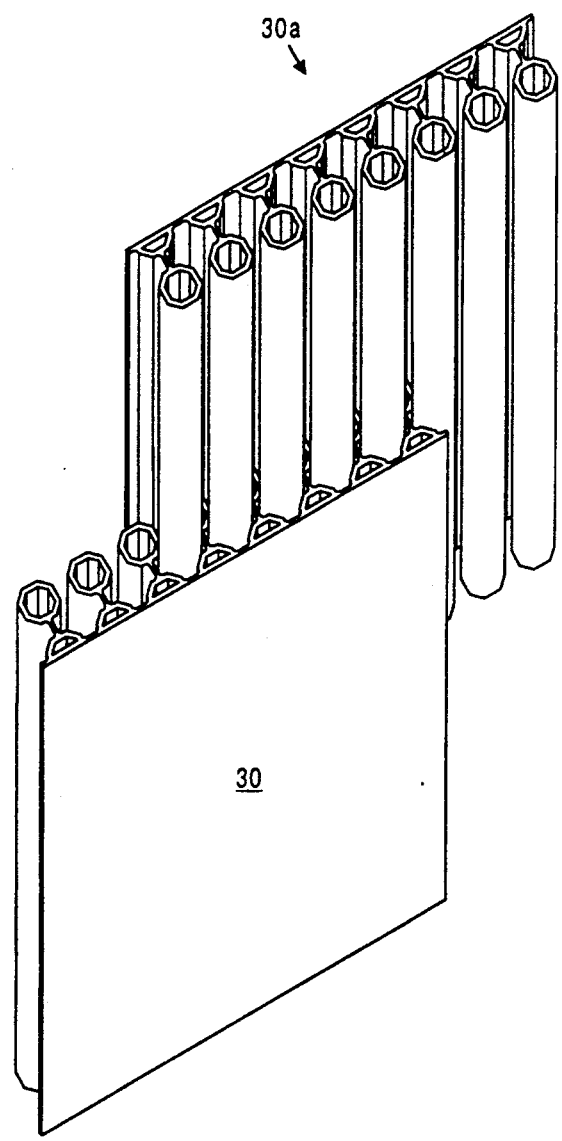

This high compression/tension condition is constant throughout structures formed. I believe that force brought to bear on one portion of a structure thus assembled spreads itself throughout the structure, subject only to limitations associated with selected materials such as, in the case of plastics, cold flow and stress relaxation. The assembly of FIG. 1 (bottom) can be used repeatedly and contiguously for making straight, rigid structures or panels of any length, such as seen in FIGS. 14, 16, 22a, and straight portions of other figures.

Operation with one construction unit

As set forth and described above, and as shown in FIGS. 1, 7, 13, 15, 16, 17, and other figures, the elements of a second, apposed unit 30a are utilized to achieve compression/tension in two interlocked units for assembling rigid structures. However, rigid structures may also be achieved within a single construction unit by the unit's own rigid members and flexible connections. FIGS. 10 and 22d show a self-contained structure having a square, honeycomb cross-section with three increments (element sets 40) per side, comprising a total of twelve increments. Elongated structural members, for example, made with this square, honeycomb cross-section, can replace solid wood of the same outside dimensions, but with less weight, to serve as posts, and the like. Shorter versions can serve as lightweight building blocks, etc.

There are two methods for accomplishing such structures:

(1) 90-degree outside corners.

Figure 5:
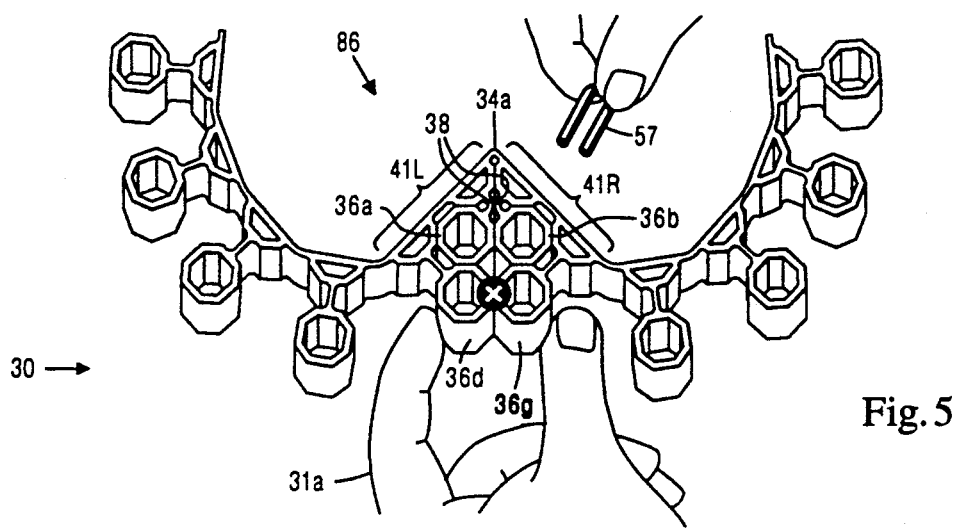

The action sequence illustrated in FIGS. 3, 4, and 5 applies. Two adjacent octagonal head members 36a and 36b are swung apart, away from each other on their respective flexible connections 38. They are pushed snugly into their adjacent spaces 42. FIG. 4 shows how their vacancy causes the opening of a generally V-shaped space 43 between them. The two resultant sub-units of elements 41L and 41R located on each side of vacant V-shaped space 43 are subsequently swung together, towards each other, on flexible connection 34a located between them until they make forced contact (FIG. 5). The tensioning of the web connections which surround locked head members set forth above also occurs when the two head members 36d and 36g are forced around head members 36a and 36b. The respective connections 38 of head members 36a and 36b, which are flexed 90-degrees, are not tensioned. These four head members are forced into contact against resistance, as shown, with fingers 31a, until clip 57 can be placed (FIGS. 5 and 6), or resistance to snap-fastener 52 is overcome, and it snaps closed, or until keyed spline 54 can be inserted (FIG. 17). The result is a rigid 90- degree outside corner 86 (FIG. 5) with its apex at flexible connection 34a. Four contiguous such corners produce the square structure of FIG. 10 and FIG. 22d without need for an apposed unit 30a. One such corner, however, can be formed at any point along a construction unit to form rigid right-angles with straight legs, such as FIG. 7. Or two contiguous such corners can be used to form structures such as FIG. 22c, both in conjunction with a second, apposed unit, both of which descriptions appear below.

(2) Isosceles triangles.

The action sequence illustrated in FIGS. 8 and 9 show two octagonal head members 36c and 36e with one element set 40 centrally located between them. In FIG. 9, head members 36c and 36e may be swung on their flexible connections 38 towards centrally located element set 40, and each other, and pushed snugly into their respective spaces 42 located immediately on both sides of element set 40. This act, coupled with forced contact with surrounding members, causes the forming of a generally 45-45-90-degree rigid isosceles triangle (FIG. 9), with its base comprised of three connected, automatically aligned bases 46. Four such triangles contiguously connected at 34a, with their adjacent equal sides in forced contact, also produces the square structure of FIG. 10 and 22d, without the need for a second unit 30a.

Forced contact with consequent compression/tension values in the above described action is necessary for the same reasons as set forth above: rigid, relatively unyielding compression resistant elements are forced into spaces too small to accommodate them, causing surrounding flexible connections to become tensioned.

These isosceles triangles can also be described as comprising adjacent halves of two contiguous 90-degree outside corners (FIG. 5) with a shared element set 40. This can be seen in the upper portion of FIG. 12. These triangles, as described here, provide the necessary rigidity in structures such as FIGS. 10, 13, 22c, 22d, and 17 (right side), and other bracket-like uses (not shown). Similar triangulation, with resultant rigidity, is automatically provided in any structure assembled according to the invention.

90-degree inside corners

FIGS. 6 and 7 show how the outside right-angle corner formation sequence described in FIGS. 3, 4, and 5 may be used in cooperation with a second apposed construction unit 30a to form inside right-angle corners 34b. Two adjacent octagonal head members 37 of the second unit 30a may be spread apart, away from each other. So spread, space 42x of construction unit 30a between its spread apart elements increases in capacity to enable the capture of both joined members 36d and 36g of unit 30. Each member 36 may be inserted into its respective space 42 of construction unit 30 located immediately on both sides of recently formed outside corner 86. Spread apart and inserted members of construction unit 30a are, in turn, captured by subsequent elements of construction unit 30. Space 42x is too small to accommodate its two captured members of construction unit 30. Consequently, previously described compression/tension is created. This now includes tensioning of inside corner 34b, and those portions of connected triangular members 32b and 32c that form a generally straight line between adjacent flexible connections 38. FIG. 7 shows how alternative interlocking of construction units 30 and 30a may continue in the previously described manner to extend both straight legs of a right-angle corner.

This interlocked combination of rigid, tensioned, seamless outside corner and inside corner makes an exceptionally strong right-angle structure 88, particularly considering the light weight and small volume of material used. They can be used to make boxes, right-angle partition walls, steps, rectangular tubes and ducts, picture frames, etc.

Assembly sequence

FIG. 22b shows a four-cornered hollow structure that may be assembled using the methods set forth above wherein four outside corners are formed first, as in FIGS. 3, 4, and 5. At this time, trial-and-error corner formation can be done with impunity, as an aid to selecting a final size. Corners may be held closed using one of the fastening methods elsewhere described.

Figure 18:
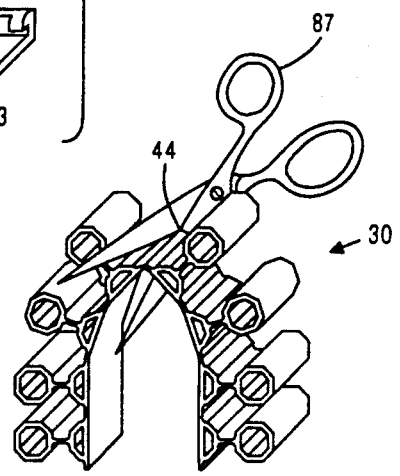
FIG. 18 is a perspective view of the construction unit being cut with a pair of scissors.

After outside incremental dimensions are selected, the outer construction unit may be cut to length with a utility knife 89, as in FIG. 2, or a pair of scissors 87 may be used, as in FIG. 18.

Inside corners and straight sides are formed when the second (inner) construction unit 30a is interlocked with the outer construction unit 30 (FIGS. 6 and 7), the inner having been cut to a length eight elements less than the outer unit. (This is always true of such four-cornered structures—regardless of the actual outside dimensions—because two elements of inner units 30a are "lost" at each corner. There are two reasons for this: [a] the dimensions of the interior periphery are shorter, and [b] the two spaces 42 that would otherwise be occupied by octagonal head members of the inner unit 30a are, instead, occupied by octagonal head members 36a and 36b of outer unit 30, as in FIGS. 3, 4, and 5.) Although the invention facilitates trial-and-error assembly, it is useful to keep this "loss" of two elements per corner in mind when planning a structure and prior to cutting construction units to length.

Other basic configurations

Figure 12:
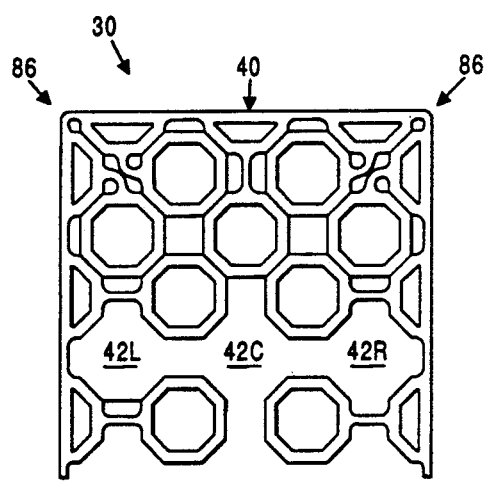

FIG. 12 shows two contiguous outside corners 86 with three aligned spaces 42L, 42C, and 42R formed according to the invention. A second construction unit 30a with at least two element sets 40 (FIG. 11) may be folded backwards, or two separate construction units used, with surfaces 46 of their triangular members 32 in back-to-back contact to form elements 36L, 32a, and 36R. These are the positive equivalents of the three aligned, equally sized spaces 42L, 42C, and 42R of FIG. 12. Two such triangular members 32, so arranged, have substantially the same shape and occupy the same volume of space as one octagonal head member 36L or 36R. It thus enables the parallel stacking of two single, rigid layers of straight structures formed according to the invention.

Figure 13:
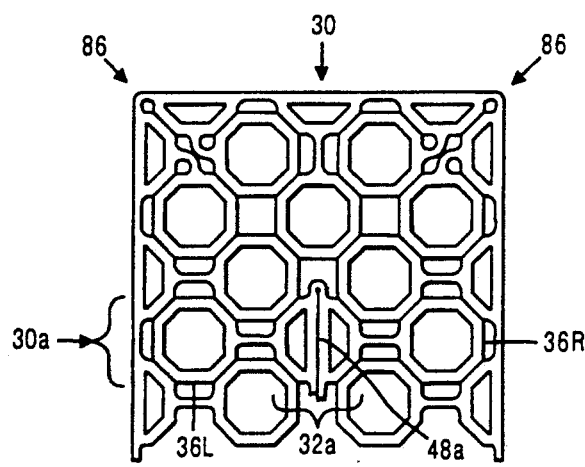

FIG. 13 shows how the aligned elements 36L, 32a and 36R fit into the spaces of FIG. 12. They provide the necessary, previously described rigidity.

FIG. 22c shows a structure that may be assembled using the method set forth in FIGS. 11, 12, and 13, and other methods, according to the invention. Such double-wall structures, for example, can replace solid wood lumber of similar proportions, such as used for joists and rafters in buildings, but with much less weight, and other advantages.

A one-piece connector similar to FIG. 11 in cross-section is contemplated as an accessory (not shown) for connecting separate, stacked structures, as seen in the center portion of FIG. 22c. These can be inserted in spaces 42L, 42C, and 42R (FIG. 12) at spaced intervals between layers, such as the center portion of FIG. 22c, to prevent their separation under stress. Alternatively, snap-fastener 52, or keyed spline 54 (FIG. 17, right) may be used at points 48a of FIG. 22c.

Assembly techniques

FIG. 14 shows how the first element sets of two units 30 and 30a, to remain interlocked, must be fastened at a point 48 at the beginning (or end) of a structure, where there is no next capturing member to prevent the separation, and consequent escape of members by compression/tension forces previously described and set forth in FIG. 1. Snap-fastener 52, or keyed spline 54 of FIG. 17 may be utilized for this purpose, or, as shown in FIG. 14, a small U-shaped clip 57 may be placed into adjacent hollow spaces 33 and/or 33a of member walls across points 48. Construction units and element sets must be kept well folded back, and well separated, as shown, prior to interlocking, to permit entrance of octagonal head members of the apposed unit. Alternating between units, each subsequent octagonal head member on the receiving unit is manually swung on its flexible connection toward, and into its mating space 42 for interlocking engagement in the apposed unit. This activity is repeated until the last two octagonal head members are reached. They are prevented from separating using the same method, or other suitable method, as the first two.

Construction units can be staggered

Figure 15:
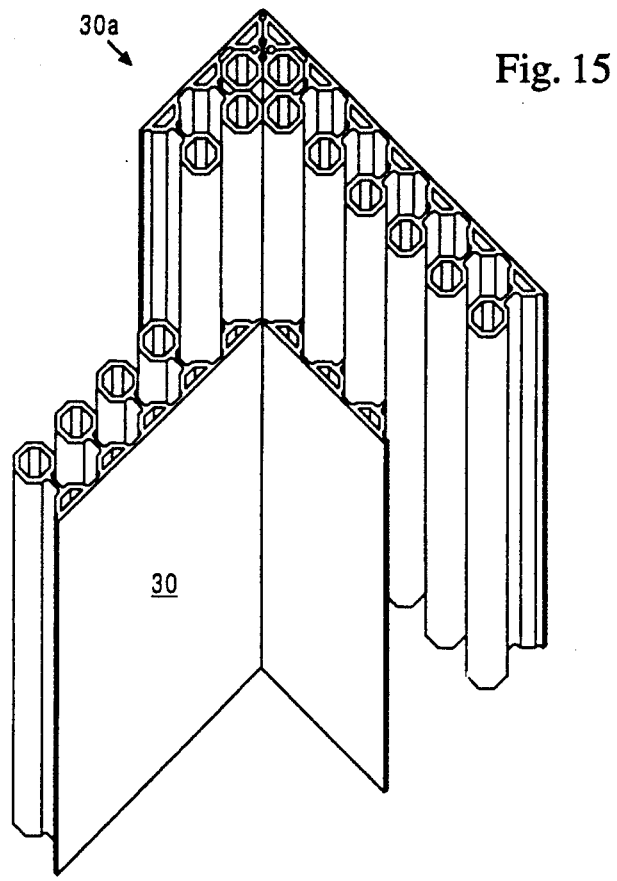
FIGS. 15 and 16 are perspective views of two construction units formed into panels assembled with staggered edges.

FIGS. 15 and 16 show how panels may be assembled, cornered or flat, from relatively small, standard construction units 30 and 30a. They are interlocked in apposition according to the invention, but with overlapped and staggered edges, both laterally and/or longitudinally. Each apposed unit gives strength and support at edges, where panels are joined. Auxilliary fasteners, described elsewhere, can be used at seams. For certain uses, small, standard units can facilitate shipping, handling, and assembly (the same way that standard floor tiles do, as compared to large, rolled floor coverings in that industry).

Combinations and permutations

In addition to features already set forth, FIG. 17 shows some other ways in which the invention may be assembled, such as: four-walls, flexibly connected, corner-to-corner by two flexible connections 32c; or four walls, rigidly connected, with hollow core center 34e between now rigid connections 34d.

In actual practice, the construction units alone, even without adapters, are capable of being formed into an enormous number of configurations. For example, inside and outside right-angle corners can be alternately mixed, as in the left portion of FIG. 17, to form Z-shapes, or steps. Such steps are ideally suited to display merchandise of different sizes and shapes in department stores. A shoe display would need a relatively short rise with a wide step, whereas a book display would need a relatively high rise with a narrow step. Steps can be adapted to be as short as one increment (not shown), which corresponds in size to one triangular base surface 46 of a construction unit, as seen in FIG. 1.

The Z-shaped configurations of certain proportions could also serve as stairs for human use. If structural reinforcement is necessary, the 45-45-90-degree triangular adapter 58 (FIG. 17, far right) could be used. This shows how adapters multiply even further the already enormous number of construction options the invention provides.

Fabrication

FIG. 22a shows how a flat panel assembled with two construction units may be cut with a table or circular saw 49 across the direction of elongation, provided that ends are first secured and prevented from opening at points 48 using a keyed spline 55, or other positive fastener. It is contemplated, though not shown, that a cut, or a mitre, perpendicular to the direction of elongation, and of controlled depth that leaves a flat surface 47 (as in FIG. 1) of the panel intact, enables that surface, along the cutting line, to perform as a hinge for folding the panel. This may be done as an alternative, or as an adjunct to accessories 60 and 61 of FIG. 17.

Holes may be drilled, or punched (not shown) into any wall of the construction units to prepare them for inserting conventional fasteners.

Conclusions, ramifications, and scope of the invention

Thus it is seen that I have provided a construction invention that:
  combines and integrates in one prefabricated unit functions that are usually separate, such as framing, paneling, fastening, insulating and finishing, thereby eliminating the need for, and expense of such separate materials and the skilled labor their assembly requires;
  is multi-purpose and adaptable into virtually unlimited configurations;
  is modular, lightweight, readaptable, easy to learn and use without need for skill, efficiently manufactured, and recycleable.

The structures and embodiments set forth are basic, and only a few examples of what can be done with the invention, and as such, are not to be construed as limitations on its scope. Many variations are possible, not only of constructions, but methods of manufacturing. For instance, the flexible connections of the invention may be made of spring steel embedded in plastic or an extrudable, hard metal, such as hardened aluminum. In this case, the spring steel would have holes punched along their longitudinal edges prior to embedding, enabling the molten material to flow through and anchor them. As another example, units of the invention may be used to construct walls for much larger elements of the invention, on a much larger scale, so that the element walls themselves, rather than being solid as described, have the lightweight, hollow core structure of the invention. It may be practical in certain applications for units to be cemented or taped together. Or tubes of different relative rigidity can be slidably inserted to provide a range of resilient support. In this way, one may, for example, easily assemble custom seating which has resilience for comfort and rigid support, each in the appropriate places. Custom blending of compression/tension within a structure could be done at will, and according to need also by interlocking units of different compression/tension values. In this way, more structural support, or greater impact resistance, may be provided where the direction of greater stress is known, such as a horizontal span that supports weight. Or, conversely, units may be interlocked whose members are too small to cause full rigidity, but large enough to prevent their escaping from between one another. This would produce semi-flexible, conformable walls that would, nevertheless, possess the other attributes of the invention, such as corner formation options. A thin-walled version might be useful in outer space, folded compactly for launching, and later, once in space, rearranged by astronauts into panels, walls, platforms, etc., all the while storing precious fluids in its hollow core structure. Alternatively, (in space, or on earth) this hollow core structure, although already a good insulator, could have plastic foam within it to improve its insulation R-value. This would not adversely effect any of the other advantages of the invention.

Many more manufacturing variations will occur to those skilled in the art, as will many more assembly variations, in actual use. This is particularly true of this invention because of its intrinsic adaptability. Inside or outside corners, or both, may be formed at any incremental point along units of the invention. It may be adapted to be rigid or flexible throughout, or at any incremental point. Units may be positively connected to each other in a variety of ways, or they may be accurately shortened. Unused portions may be used in future assemblies. Structures may be nondestructively disassembled, and units which comprised it may be reused in other structures. Units may be manufactured of relatively indestructable materials that match its long-term utility, yet may, nevertheless, be recycled. Or they can be glued for permanent construction. It can be adapted for a wide range of uses, from an engaging construction toy, to adaptable picture framing, through full-scale partition walls for human habitation to possible use in outer space.

Accordingly, the scope of the invention should be determined not by the embodiments illustrated, but by the appended claims and their legal equivalents.

I claim:

1. A standard construction unit for modular use, comprising:
   (a) a flat sheet of material having opposed major surfaces,
   (b) a plurality of sets of locking elements attached to one of said major surfaces of said sheet,
   (c) each set of locking elements comprising a base member, a neck member attached to said base member, and a head member attached to said neck member,
   (d) said base members each:
     (1) being elongated in a first direction parallel to said sheet and having a predetermined dimension in a second direction parallel to said sheet and perpendicular to said first direction,
     (2) extending away from one surface of said sheet in a third direction perpendicular to said sheet so as to form an elongated platform having an upper surface spaced from said one major surface of said sheet in said third direction,
     (3) being attached to said one surface of said sheet,
     (4) extending parallel to all other base members in said first direction,
     (5) being evenly spaced from adjacent base members on said sheet in said second direction so as to define a uniform spacing between all adjacent pair of base members, and
     (6) being separated from each adjacent base member by an elongated web portion of said sheet,
   (e) each neck member:
     (1) having lower and upper end, said lower end attached to said upper surface of said platform formed by a corresponding base member, said neck member extending away form said upper surface of said platform in said third direction,
     (2) extending in said first direction and being parallel to all other neck members,
     (3) being evenly spaced in said second direction from adjacent neck members so as to define a uniform spacing between each adjacent pair of neck members, and
     (4) being flexible enough to be repeatedly bent by 90 degrees and having a thickness, as measured in said second direction, which is less than the thickness of the head and base members which it interconnects, such that the space between any pair of adjacent neck members is greater than the space between any corresponding adjacent pair of head members and any corresponding adjacent pair of base members,
   (f) said head members each:
     (1) being attached to and extending away from said upper end of said neck member in said third direction,
     (2) extending in said second direction and being parallel to each other,
     (3) being evenly spaced in said second direction so as to define a space between each adjacent pair of head members,
     (4) having a predetermined cross-sectional area, when seen from said first direction,
   (g) each of said base members having a predetermined cross-sectional area, when seen from said first direction, which is about half of said cross-sectional area, of each of said head members,
   (h) said sheet being sufficiently flexible that it can be repeatedly bent by 90 degrees and returned without breaking along a bend line along any of said web members.

2. The construction unit of claim 1, further including a plurality of contact points on each of said locking element sets, said contact points being extended in said first direction and parallel to each other, some of said contact points of each set of adjacent locking elements connected by said sheet apposed to corresponding said contact points on adjacent locking elements sets, the distance between said base members and said head members of each of said locking element sets, and the distance between corresponding locking members of adjacent said element sets, as measured from respective adjacent contact points, being less than the distance between adjacent contact points on each said member of said locking element sets.

3. The construction unit of claim 1 wherein each of said base members has a generally triangular cross-sectional shape.

4. The construction unit of claim 1 wherein each of said base members is hollow.

5. The construction unit of claim 1, further including adjacent sets of locking elements connected by said web portion of said flat sheet, wherein at least one of said head members of said adjacent sets is flexed on said attached neck member in a third direction towards said adjacent set of locking elements and is parallel to said sheet, perpendicular to, between, and in direct contact with the base member to which it is attached and said adjacent set of locking elements located in said third direction, whereby said adjacent locking element sets together form a rigid sub-unit having a 45-degree angle.

6. The construction unit of claim 5, further including at least a second adjacent similar rigid sub-unit, said sub-units attached to each other by said web portion of said flat sheet centrally located between them, each respective said 45-degree angle of said rigid sub-units extending symmetrically from said central web portion, at least one of said rigid sub-units flexed in said second direction on said central web connection, being perpendicular to, and in direct contact with said second rigid sub-unit to which it is attached, whereby adjacent said rigid sub-units each having a 45-degree angle together form a rigid 90-degree angle.

7. The construction unit of claim 1, further including a second construction unit similar to said first-named construction unit, at least one locking element of one of said two construction units being interlocked between an adjacent pair of locking elements connected by said flat sheet of the other of said two construction units such that the head member of said one locking element is positioned symmetrically between the neck members of said adjacent pair of locking elements, and the distance between said contact points of said locking element sets of both said interlocked construction unit are substantially equal.

8. The construction unit of claim 7 wherein at least one of said locking elements contains means for compounding and transmitting force from one of its adjacent elements to the other, whereby head and base members are compressed, and the web portions of the flat sheet and neck members are tensioned.

9. The construction unit of claim 1 wherein said head members each has a cross-sectional shape which is larger, in said second dimension and a third dimension perpendicular to said first dimension, than said neck member's dimension in said second dimension.

10. The construction unit of claim 9 wherein each of said head members is hollow and has a generally octagonal cross-sectional shape.

11. The construction unit of claim 1 wherein each of said head members has a generally octagonal cross-sectional shape.

12. The construction unit of claim 11 wherein each of said head and base members is hollow.

13. The construction element of claim 1 wherein at least two of said sets of locking elements are symmetrically aligned, with said flat sheet of said base members in contact with each other, two of said base members in said contact together having substantially the same shape and occupying the same volume of space as one of said head members.

14. The invention of claim 13, further including a plurality of keyed slots located on at least a plurality of said contact points of said locking elements, each said keyed slot adapted to slidably receive a keyed spline.

15. The construction element of claim 1, further including auxiliary fastening means for fastening adjacent locking element sets whereby endmost and otherwise unlocked sets of locking elements can be fastened to adjacent sets of locking elements.

16. The construction unit of claim 15 further including a plurality of integral male/female snap-fasteners located on at least a plurality of respective said contact points of said locking elements.

17. The construction unit of claim 15, further including a plurality of U-shaped clips, each of said clips being inserted into at least two adjacent said hollow head and base members.

18. The construction unit of claim 1 wherein at least a portion of said flat sheet is attached to said base member and extends away from said base member in said first direction, said sheet terminating with a lip perpendicular to said first direction, said lip being spaced from, apposed to, and pointing in said first direction, whereby said base member, said extended sheet portion, and said lip together form a substantially J-shaped channel in which pictures and the like may be held.

19. The construction unit of claim 18 wherein said extension and said retaining lip are integral with said base member.

20. The construction unit of claim 18 wherein said extension and said retaining lip include means for being snapped-fastened onto said base member.

* * * * *